(12) United States Patent
Singh et al.

(10) Patent No.: US 9,288,656 B2
(45) Date of Patent: Mar. 15, 2016

(54) DEVICE TO DEVICE DISCOVERY METHOD FOR USER EQUIPMENT AND NETWORK ENTITY AND USER EQUIPMENT AND NETWORK ENTITY USING THE SAME

(71) Applicant: Industrial Technology Research Institute, Hsinchu (TW)

(72) Inventors: Shubhranshu Singh, Hsinchu (TW); Yan-Xiu Zheng, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 14/578,505

(22) Filed: Dec. 22, 2014

(65) Prior Publication Data

US 2015/0201318 A1    Jul. 16, 2015

Related U.S. Application Data

(60) Provisional application No. 61/926,927, filed on Jan. 13, 2014.

(51) Int. Cl.
  *H04W 8/00* (2009.01)

(52) U.S. Cl.
  CPC ..................... *H04W 8/005* (2013.01)

(58) Field of Classification Search
  CPC ........................ H04W 8/005; H04W 76/023
  See application file for complete search history.

(56) References Cited

U.S. PATENT DOCUMENTS

| | | | |
|---|---|---|---|
| 8,666,403 B2 | 3/2014 | Yu et al. | |
| 2013/0109301 A1 | 5/2013 | Hakola et al. | |
| 2013/0109314 A1* | 5/2013 | Kneckt | H04W 4/008 455/41.2 |
| 2013/0288668 A1 | 10/2013 | Pragada et al. | |
| 2014/0031028 A1* | 1/2014 | Yamada | H04W 8/005 455/419 |
| 2014/0036793 A1 | 2/2014 | Johnsson et al. | |

(Continued)

FOREIGN PATENT DOCUMENTS

| | | |
|---|---|---|
| CN | 103428817 | 12/2013 |
| TW | I393011 | 4/2013 |

(Continued)

OTHER PUBLICATIONS

"Updates to Annex I Section 5.x.5," ITRI, SA WG2 Meeting #101, S2-140523, Jan. 20-24, 2014, Taipei, Taiwan.

(Continued)

*Primary Examiner* — Nathan Mitchell
(74) *Attorney, Agent, or Firm* — Jianq Chyun IP Office

(57) ABSTRACT

This disclosure is directed to a D2D discovery method applicable to a UE and a network entity and a UE and a network entity using the same. In one of the exemplary embodiments, this disclosure is directed to a D2D discovery method that is applicable to a network entity and includes at least but not limited to receiving a first cancel proximity request comprising a network level discoverer identifier (ID), an application ID, and an application layer discoveree ID, transmitting a second cancel proximity request comprising the network level discoverer ID and a network level discoveree ID in response to receiving the first cancel proximity request, receiving a first acknowledgement signal that corresponds to the second cancel proximity request in response to transmitting the second cancel proximity request, and transmitting a second acknowledgement signal that corresponds to the first cancel proximity request in response to receiving the first acknowledgement signal.

29 Claims, 11 Drawing Sheets

(56) References Cited

U.S. PATENT DOCUMENTS

| | | | |
|---|---|---|---|
| 2014/0064163 A1 | 3/2014 | Tsirtsis et al. | |
| 2014/0128067 A1* | 5/2014 | Lim | H04W 8/005 455/435.1 |
| 2014/0204898 A1 | 7/2014 | Yang et al. | |
| 2014/0206348 A1 | 7/2014 | Johnsson et al. | |
| 2014/0219261 A1 | 8/2014 | Johnsson | |
| 2014/0302784 A1* | 10/2014 | Kim | H04W 8/005 455/41.2 |
| 2014/0335853 A1* | 11/2014 | Sartori | H04W 76/023 455/426.1 |

FOREIGN PATENT DOCUMENTS

| | | |
|---|---|---|
| TW | 1410808 | 10/2013 |
| TW | 201346585 | 11/2013 |
| TW | 1418991 | 12/2013 |
| TW | 201419892 | 5/2014 |

OTHER PUBLICATIONS

"3rd Generation Partnership Project; Technical Specification Group Services and System Aspects; Study on architecture enhancements to support Proximity-based Services (PreSe) (Release 12)," 3GPP TR 23.703 V1.1.0, Jan. 2014.

"Office Action of European Counterpart Application," issued on Jul. 27, 2015, p. 1-p. 6.

"3rd Generation Partnership Project; Technical Specification Group Services and System Aspects; Proximity-based services (ProSe); Stage 2 (Release 12)," 3GPP TS 23.303 V12.2.0, Sep. 2014.

Osman N. C. Yilmaz, et al., "Smart Mobility Management for D2D Communications in 5G Networks," 2014 IEEE Wireless Communications and Networking Conference Workshops (WCNCW), Apr. 6-9, 2014, pp. 219-223.

Mohsen Nader Tehrani, et al., "Device-to-Device Communication in 5G Cellular Networks: Challenges, Solutions, and Future Directions," Communications Magazine, IEEE, vol. 52, Issue 5, May 2014, pp. 86-92.

"SA WG2 Meeting #101," SA WG2 Temporary Document, No. S2-140523, Jan. 20-24, 2014, Taipei, Taiwan.

"3rd Generation Partnership Project; Technical Specification Group Services and System Aspects; Study on architecture enhancements to support Proximity-based Services (ProSe), Release 12," 3GPP TR 23.703 V0.8.0, Nov. 2013.

"LTE Direct the Case for Device-to-Device Proximate Discovery," Qualcomm Research, Qualcomm Technologies, Inc., Feb. 18, 2013, pp. 1-10.

"3rd Generation Partnership Project; Technical Specification Group Services and System Aspects; System Improvements for Machine-Type Communications; (Release 11)," 3GPP TS 22.278 V10.1.0, Mar. 2010.

"Office Action of Taiwan Counterpart Application", issued on Nov. 13, 2015, p. 1-p. 3.

* cited by examiner

DEVICE TO DEVICE DISCOVERY METHOD FOR USER EQUIPMENT AND NETWORK ENTITY AND USER EQUIPMENT AND NETWORK ENTITY USING THE SAME

CROSS REFERENCE TO RELATED APPLICATION

This application claims the priority benefit of U.S.A. provisional application Ser. No. 61/926,927, filed on Jan. 13, 2014. The entirety of the above-mentioned patent application is hereby incorporated by reference herein and made a part of specification.

TECHNICAL FIELD

The present disclosure is a device to device (D2D) discovery method applicable to a user equipment (UE) and a network entity and a UE and a network entity using the same method.

BACKGROUND

When a UE seeks to either discover or be discovered, a ProSe or D2D discovery process is often required. A ProSe discovery process is a process that identifies whether a ProSe-enabled discoverer UE is in the proximity of another ProSe-enabled discoveree UE, with or without the assistance of an Evolved Packet Core (EPC) which is considered a core network for the case of a Long Term Evolution (LTE) communication system. Said network assistance may or may not involve the Evolved Universal Terrestrial Radio Access Network (E-UTRA). Whenever a UE meets the proximity criteria relative to another UE, the UE can be said to be in proximity of another UE. The proximity criteria could involve at least a specific distance or a certain communication range class and could be different for the discovery process and any subsequent communication phase.

When the ProSe discovery process occurs in the EPC-level, the ProSe discovery process would involve a discovery procedure by which the EPC determines the proximity of two ProSe-enabled UEs and informs is them of their proximity. Prose-enabled UEs refers to UEs that support the current ProSe requirement and associated procedures [Reference 3GPP TS 23.278]. A Prose-enabled UE could also be a non-public safety UE e.g., a UE with commercial applications, a public safety UE, or both. Each ProSe-enabled UE may have a range class, which is a rough indication of distance for use in ProSe Discovery, for example, based on geographical distance, radio conditions.

A ProSe discovery process may involve different types of identifiers (ID). An EPC ProSe user ID is an identifier for EPC-level ProSe discovery and EPC support of WLAN direct communication to uniquely identify a UE registered for ProSe. This identifier could occasionally be reassigned by the ProSe Function in an EPC network. A ProSe Function ID is a fully qualified domain name (FQDN) that uniquely identifies a ProSe Function. An application ID is a globally unique identifier that identifies a specific application. An application Layer User ID is an identifier that identifies a user within the context of specific application. A wireless local area network (WLAN) Link Layer ID is a link layer identity that is used for WLAN direct discovery and/or WLAN direct communication. The WLAN Link Layer ID could be temporary such as a temporary MAC address or could be permanent such as a permanent MAC address.

D2D Communication, Proximity Communication, or ProSe Communication is a new feature that is currently being developed within the third generation partnership project (3GPP) as part of Release-12 and Release-13. There could be at least two main approaches for Proximity discovery—EPC-level ProSe discovery and ProSe Direct discovery. Both discoveries may be complementary solutions but can also be implemented independently. FIG. 1 illustrates an exemplary network architecture by which an EPC-level discovery is processed. The entities could involve a first UE 101 and a second UE 102 which would both be capable of ProSe applications or could both be ProSe-enabled. The entities may also involve the E-UTRAN 103. The ProSe Function 104 stands for D2D or ProSe functions collectively supported by an EPC network. The E-UTRAN 103 would be connected to a mobility management entity (MME) 105 the E-UTRAN 103 may also connect directly to a ProSe Function 104 within the EPC. The ProSe Function 104 would be connected to a Secured User Plane Location Platform (SLP) 106 through which location information could be obtained or approximated. The ProSe Function 104 could be connected to a ProSe application server 107 that could be a third party server and not an inherent part of the EPC network. Specific descriptions of the aforementioned entities are described by at least 3GPP technical specification (TS) 23.303 which are incorporated by reference and thus will not be repeated.

FIG. 2 shows a typical call flow of EPC-level ProSe discovery as utilized in a draft standard such as 3GPP TR 23.703 v1.0.0 which is incorporated by reference. The steps shown in FIG. 2 are to be briefly described as follows. In step S201, UE A would be assumed to perform UE registration for ProSe communication with the Prose Function A residing in their respective home public land mobile networks (Home PLMNs). In step S202, UE B would perform in UE registration for ProSe with the ProSe Function B residing in their respective Home PLMNs. Similarly, in steps S203 & S204, UE A and UE B would perform a ProSe application registration with ProSe Function A and ProSe Function B respectively in their Home PLMNs. In step S205, UE A would make a proximity request for UE B and receive an appropriate response in return. For example, if UE B is in the proximity of UE A within a predefined window of time, then UE A might be alerted for the presence of UE B. In response to the proximity request, ProSe Function A would request for a location update for UE A and for UE B. The location updates could be periodic or could be based on a triggered event or both. In order to request location updates for UE A, ProSe Function A would contact the SUPL Location Platform (SLP) A. Likewise, in order to request a location update for UE B, ProSe Function A would contact ProSe Function B, which would in turn request a location update for UE B from SLP B.

In step 206, ProSe Function A receives a report of the location of UE A from SLP A. In step S207, ProSe Function B receives a report of the location of UE B from SLP B. The locations of UE A and UE B could be reported to their respective ProSe Functions intermittently. ProSe Function B may forward the updates of location of UE B to ProSe Function A based on conditions set by ProSe Function A. Also, whenever ProSe Function A receives location updates for UE A and/or UE B, Prose Function A may perform proximity analysis for the locations of UE A and UE B. In step S208, when ProSe Function A detects that UE A and UE B are in proximity, ProSe Function A would informs UE A that UE B is in proximity and may optionally provide UE A with an assistance information for WLAN direct discovery and communication with UE B. Likewise, ProSe Function A would also inform ProSe Function B, which in turn would inform UE B of the detected proximity of UE A. The Prose Function B may also optionally provide UE B with an assistance information for WLAN direct discovery and communication with UE A.

SUMMARY OF THE DISCLOSURE

Accordingly, the present disclosure is directed to a D2D discovery method applicable to a UE and a network entity, and a UE and a network entity using the same method.

In one of the exemplary embodiments, the present disclosure is directed to a D2D discovery method that is applicable to a UE and includes at least but not limited to initiating a D2D discovery process with a first window value, wherein the first window value stands for a time window and is a positive number, transmitting a first proximity discovery request comprising the first window value, detecting a cancellation event to cancel the D2D discovery process in response to transmitting the first proximity discovery request, stopping the D2D discovery process if the first window value decreases to a specific threshold in response to detecting the cancellation event, and transmitting a first cancel proximity discovery request to cancel the D2D discovery process in response to receiving the cancellation event if another proximity discovery request does not exist within the UE.

In one of the exemplary embodiments, the present disclosure is directed to a UE that includes at least but not limited to a transmitter and receiver for transmitting and receiving wireless data respectively and a processing circuit coupled to the transmitter. The processing circuit is configured for initiating a D2D discovery process with a window value, wherein the window value stands for a time window and is a positive number, transmitting a first proximity discovery request comprising the window value, detecting a cancellation event to cancel the D2D discovery process in response to transmitting the first proximity discovery request, stopping the D2D discovery process if the window value decreases to a specific threshold in response to detecting the cancellation event, and transmitting a cancel proximity discovery request to cancel the D2D discovery process in response to receiving the cancellation event if another proximity discovery request does not exist within the UE.

In one of the exemplary embodiments, the present disclosure is directed to a D2D discovery method that is applicable to a network entity and includes at least but not limited to receiving a first proximity discovery request comprising a first window value to execute a network assisted D2D discovery process, wherein the first window value is a non-negative number, performing a proximity estimation and a user equipment (UE) status estimation in response to receiving the proximity discovery request, cancelling the network assisted D2D discovery process in response to performing the proximity estimation and the UE status estimation, wherein cancelling the network assisted D2D discovery process would include transmitting a cancel proximity discovery request and transmitting a cancel location reporting request.

In one of the exemplary embodiment, the present disclosure is directed to a network entity that includes at least but not limited to a transmitter and a receiver for transmitting and receiving signals and a processor coupled to the transmitter and the receiver. The processor is configured for receiving through the receiver a first cancel proximity request comprising a network level discoverer identifier ID), an application ID, and an application layer discoveree ID, transmitting through the transmitter a second cancel proximity request comprising the network level discoverer ID and a network level discoveree ID in response to receiving the first cancel proximity request, receiving through the receiver a first acknowledgement signal that corresponds to the second cancel proximity request in response to transmitting the second cancel proximity request, and transmitting through the transmitter a second acknowledgement signal that corresponds to the first cancel proximity request in response to receiving the first acknowledgement signal.

In one of the exemplary embodiments, the present disclosure is directed to a D2D discovery method that is applicable to a network entity and includes at least but not limited to receiving a first cancel proximity request that includes a network level discoverer identifier (ID), an application ID, and an application layer discoveree ID, transmitting a second cancel proximity request comprising the network level discoverer ID and a network level discoveree ID in response to receiving the first cancel proximity request, receiving a first acknowledgement signal that corresponds to the second cancel proximity request in response to transmitting the second cancel proximity request, and transmitting a second acknowledgement signal that corresponds to the first cancel proximity request in response to receiving the first acknowledgement signal.

In order to make the aforementioned features and advantages of the present disclosure comprehensible, exemplary embodiments accompanied with figures are described in detail below. It is to be understood that both the foregoing general description and the following detailed description are exemplary, and are intended to provide further explanation of the disclosure as claimed.

It should be understood, however, that this summary may not contain all of the aspect and embodiments of the present disclosure and is therefore not meant to be limiting or restrictive in any manner. Also the present disclosure would include improvements and modifications which are obvious to one skilled in the art.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION OF DISCLOSED EMBODIMENTS

Figure 1:
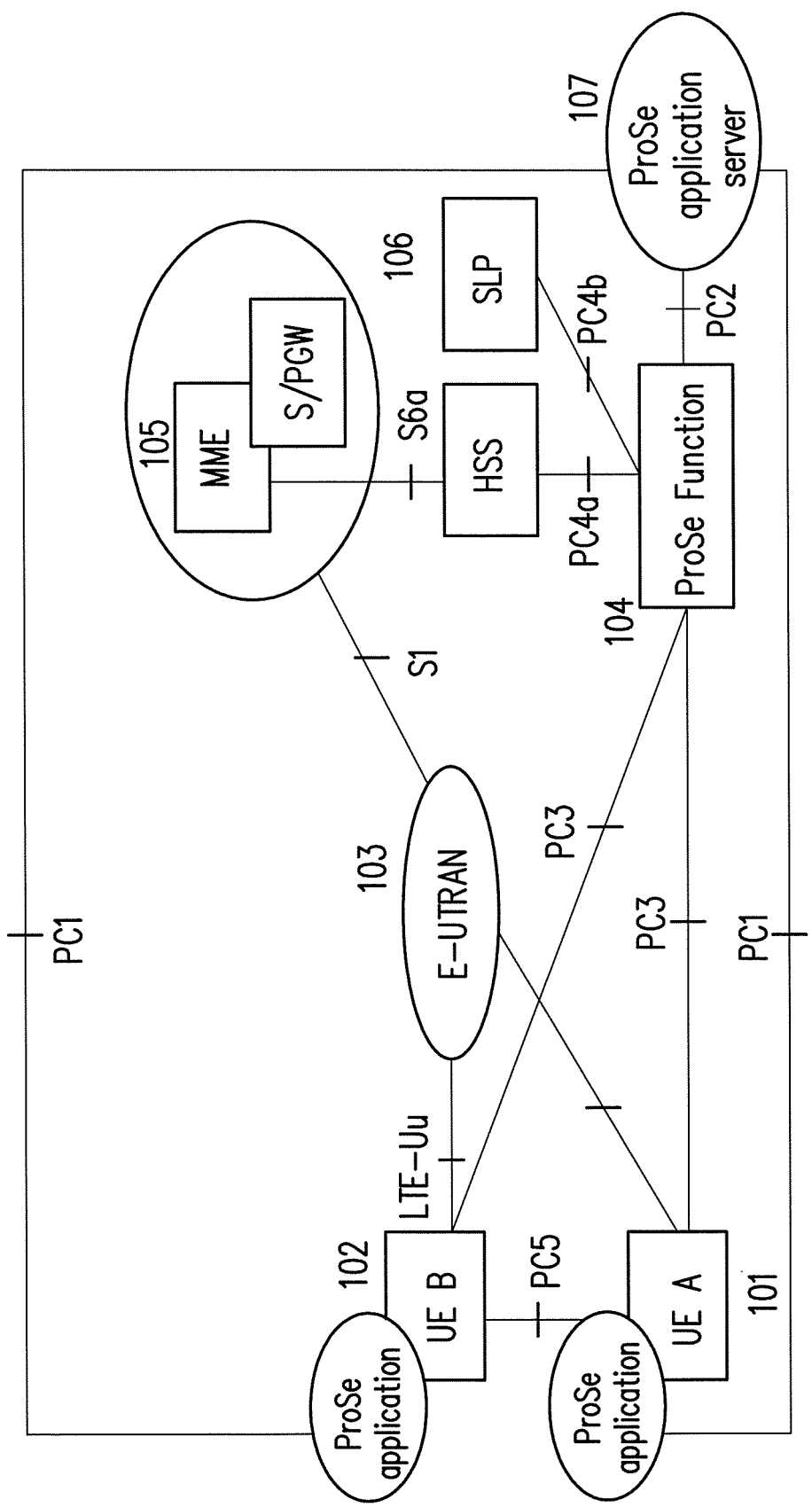
FIG. 1 illustrates an exemplary network architecture by which an EPC-level discovery is processed.
Figure 2:
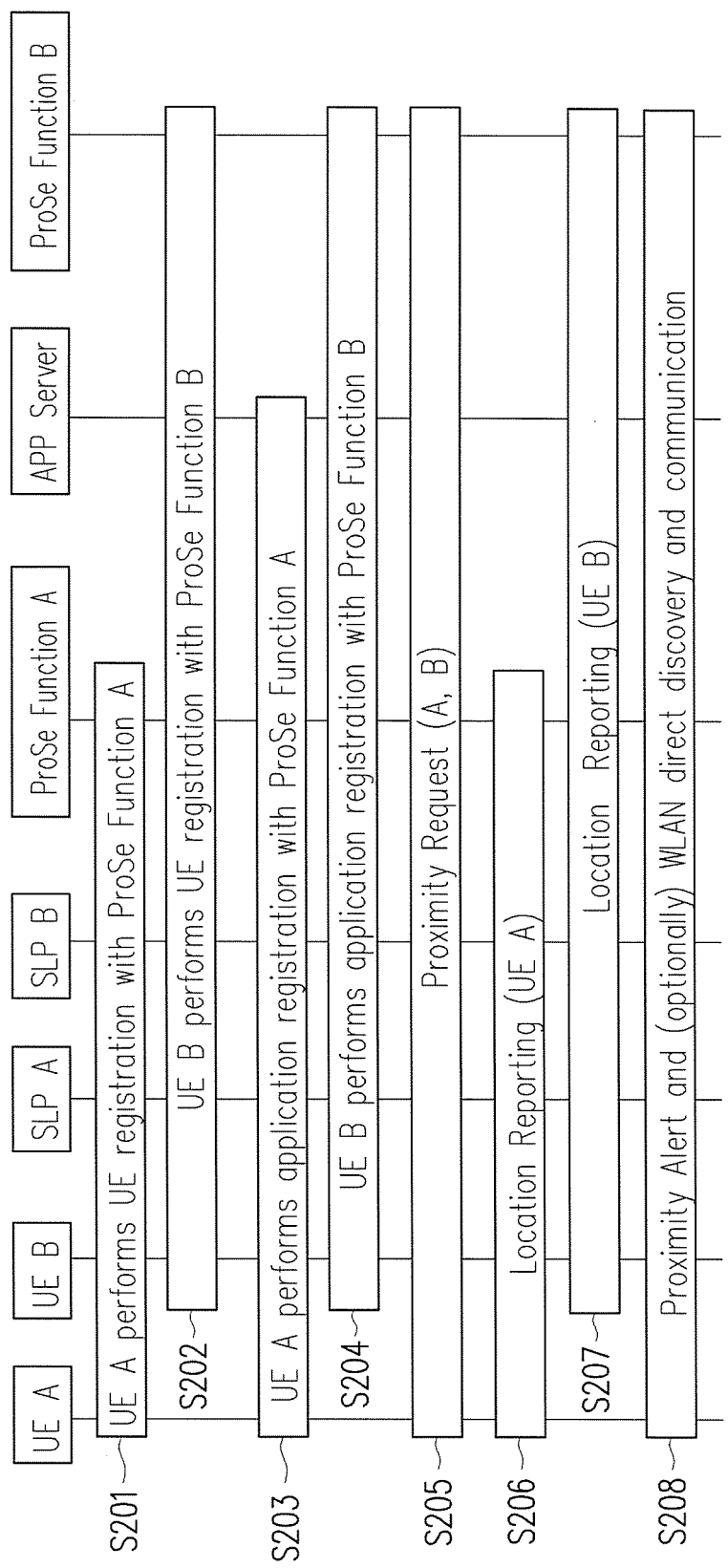
FIG. 2 illustrates a general call flow of EPC-level ProSe discovery.

Reference will now be made in detail to the present exemplary embodiments of the disclosure, examples of which are illustrated in the accompanying drawings. Wherever possible, the same reference numbers are used in the drawings and the description to refer to the same or like parts.

The present disclosure proposes a ProSe discovery process that is applicable to a UE and a network entity. The present disclosure also proposes a UE and a network entity that use the same ProSe discovery process. One of the objectives of the disclosure would include enabling a ProSe capable UE as well as a ProSe capable network entity such as the ProSe Function to dynamically stop a ProSe discovery procedure based on the demands of applications and network conditions as well as user preferences and settings. The aforementioned ProSe Function is an entity within a core network such as the EPC and may provide proximity based services. The exemplary embodiments of the present disclosure would further include minimizing network signaling related to proximity estimation and avoiding unnecessary computational power related to location update and proximity estimation.

The proposed solution of the present disclosure would include two halves which could be integrally or independently implemented. One is a UE based hand-shaking procedure that is designed to dynamically allow a ProSe discovery procedure to be cancelled even before an originally set window value expires. The other is a modified network-assisted procedure to dynamically terminate an ongoing ProSe discovery process. The proposed solution could be implemented by using the network architecture show in FIG. 1, but the signaling procedures as well as functionalities of UEs and ProSe Function has been modified. In particular, UE A may dynamically send a proximity request cancellation command to a network entity such as ProSe Function based on the execution of the mechanism to be illustrated in FIGS. 3–5 and described by their corresponding written descriptions. By using cancellation signaling or appropriate parameters among UEs and network entities such as ProSe Functions and location servers, a UE may effectively terminate an ongoing ProSe discovery process.

Figure 3:
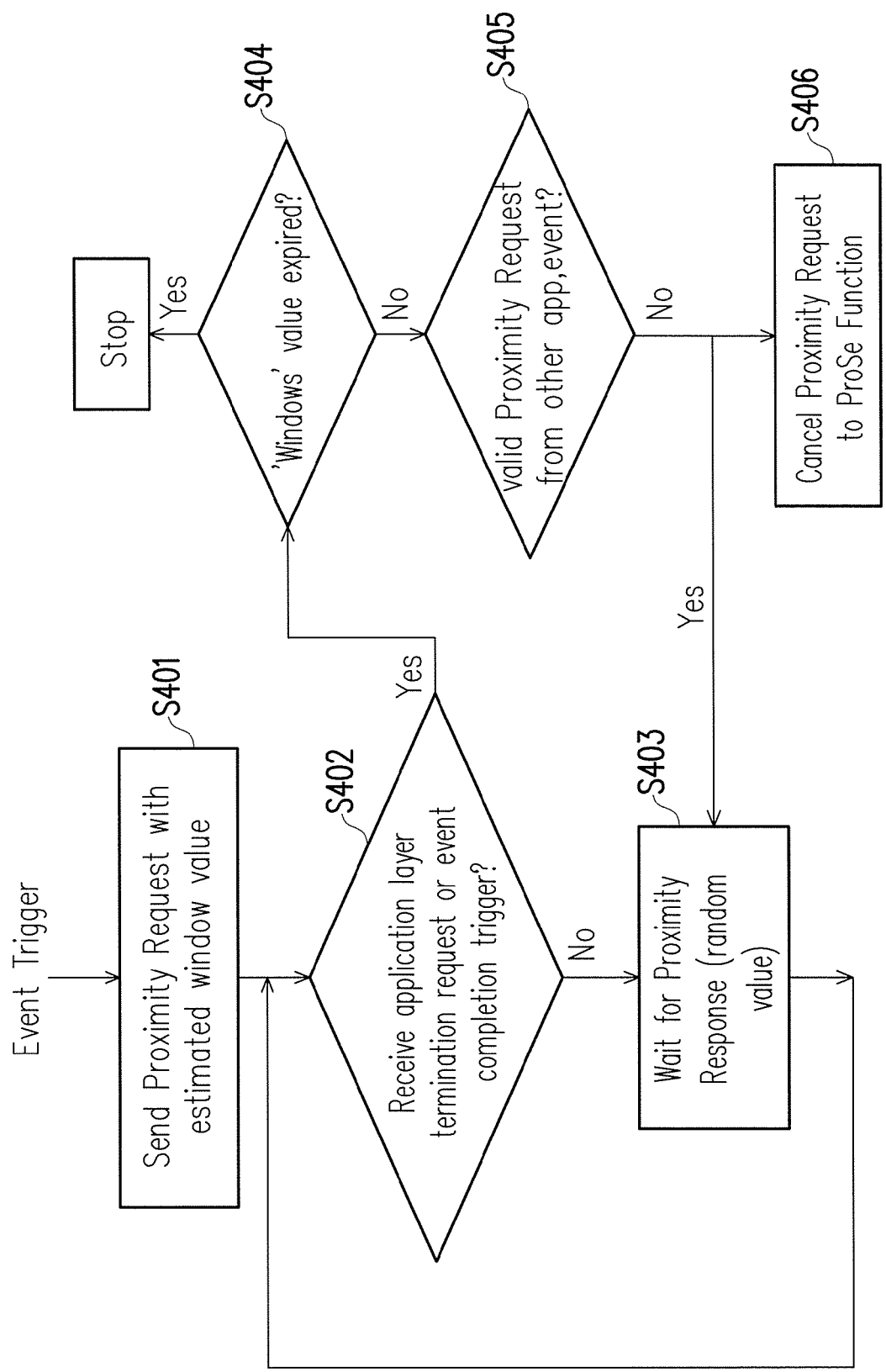
FIG. 3 is a flow chart that illustrates a network assisted ProSe discovery process from the perspective of a ProSe Enabled UE in accordance with one of the exemplary embodiment of the present disclosure.

FIG. 3 is a flow chart that illustrates a network assisted ProSe discovery process from the perspective of a UE in accordance with one of the exemplary embodiment of the present disclosure. In step S401, after receiving an event trigger to initiate a ProSe discovery procedure, the UE would transmit a Proximity Request to be routed to a network entity such as ProSe Function 104 of FIG. 1 of a network. The event trigger could occur, for example, when a user of the UE activates or reactivates a ProSe application or a ProSe related application. The proximity request is for detecting whether another ProSe enabled D2D UE is in proximity or likely to be in proximity during the time period indicated by 'window' value of the UE that initiated the proximity request. Proximity Request, for example, could be consistent with a current version of a LTE specification such as TR 23.703 v1.0.0 as mentioned previously. Upon receiving the Proximity Request, the network entity such as ProSe Function 104 may initiate a ProSe discovery procedure. The Proximity Request may include an estimated window value so that before the window value expires, the Proximity Request could remain valid and the activation and maintenance of location reporting could also be executed during the time period indicated by window value.

In step S402, before the window value expires, the UE determines whether it has received any termination request, for example from the application layer to terminate the ProSe discovery procedure or a termination request triggered by the completion of the ProSe discovery procedure. If the termination request is not received, then in step S403, the UE would continuously wait for a Proximity Response from the network as long as the window value has not expired or wait for a termination request from the application layer as the process would go back to step S402. The Proximity Response could include a random value and could be consistent with a current LTE specification such as TR 23.703 v1.0.0. If a termination request has been received in step S402, then in step S404, the UE would determine whether the window value has expired. If the window value has expired, then the ProSe discovery procedure ends. If the window value has not expired, then in step S405, the UE would determine whether there is another valid Proximity Request from another application or whether the UE has received another trigger event to enter a ProSe discovery process. If no other trigger event or Proximity Request was received, then in step S406 the UE would signal the network entity to cancel the Proximity Request to ProSe Function. Otherwise, if another trigger event or Proximity Request has been determined to have been received, then the process continues in step S403. The cancellation procedure of the proposed ProSe discovery procedure as illustrated in FIG. 3 could be implemented according to at least two exemplary embodiments to be described by FIG. 4, FIG. 5, and their corresponding written descriptions.

Figure 4:
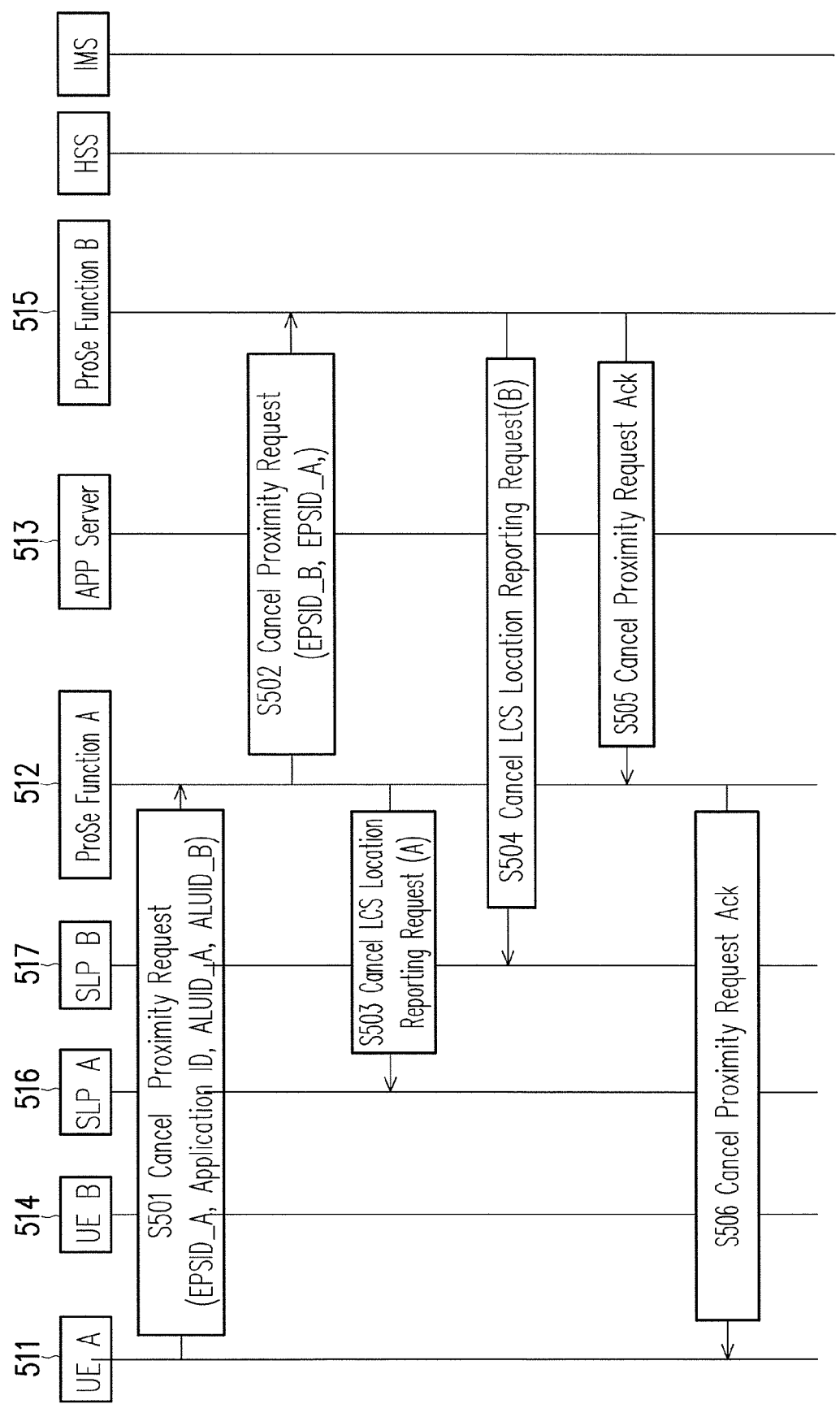
FIG. 4 illustrates a cancellation procedure of a ProSe enabled UE initiated ProSe discovery process in accordance with one of the exemplary embodiment of the present disclosure.

FIG. 4 illustrates a cancellation procedure of a UE initiated ProSe discovery process in accordance with one of the exemplary embodiment of the present disclosure. The cancellation procedure of FIG. 4 may correspond to step S406 of FIG. 3. However, it would be apparent for an ordinary skilled in the art that the cancellation procedure of FIG. 4 could be independent from the discovery process in FIG. 3 and thus would not correspond to step S406. In step S501, the UE A 511 transmits a first Cancel Proximity Request that is to be routed to a network entity such as a ProSe Function A 512 of an EPC. The first Cancel Proximity Request would contain parameters not limited to EPSID_A, Application ID, ALUID_A, and ALUID_B. The application ID would identify a $3^{rd}$ party application server platform, or the App Server 513 of FIG. 3. The EPSID_A is the ProSe subscriber ID for UE A 511. The ALUID_A and ALUID_B are the application layer user ID of UE A 511 and UE B 514. Upon receiving the first Cancel Proximity Request, the ProSe discovery process is treated as cancelled by ProSe Function A 512.

In step S502, in response to receiving the first Cancel Proximity Request, the ProSe Function A 512 would transmit a second Cancel Proximity Request to ProSe Function B 515 in order to inform ProSe Function B 515 and subsequently SLP A 516 and SLP B 517 of the cancellation of a D2D proximity request that has been initiated by the UE A 511. The second Cancel Proximity Request contains parameters not limited to EPSID_A and EPSID_B. The EPSID_B is the ProSe subscriber ID for UE B 514. In step S503, in response to receiving the second Cancel Proximity Request, ProSe Function A 512 would transmit a first Cancel LCS location Reporting Request to SLP A 516 in order to cancel the location reporting of UE A 511. Similarly, in step S504, ProSe Function B 515 would transmit a second Cancel LCS location Reporting Request to SLP B 517 in order to cancel the location reporting of UE B 514. In step S505, after receiving the second Cancel Proximity Request from ProSe Function A 512, ProSe Function B 515 would transmit a first Cancel Proximity Request Ack to ProSe Function A 512 in order to acknowledge the reception of the first Cancel Proximity Request signal. In response to receiving the first Cancel Proximity Request Ack, ProSe Function A 512 would transmit a second Cancel Proximity Request Ack to UE A 511 in order to info in UE A 511 about the network acknowledgment of the cancelling of the Proximity Request back in step S501.

Figure 5:
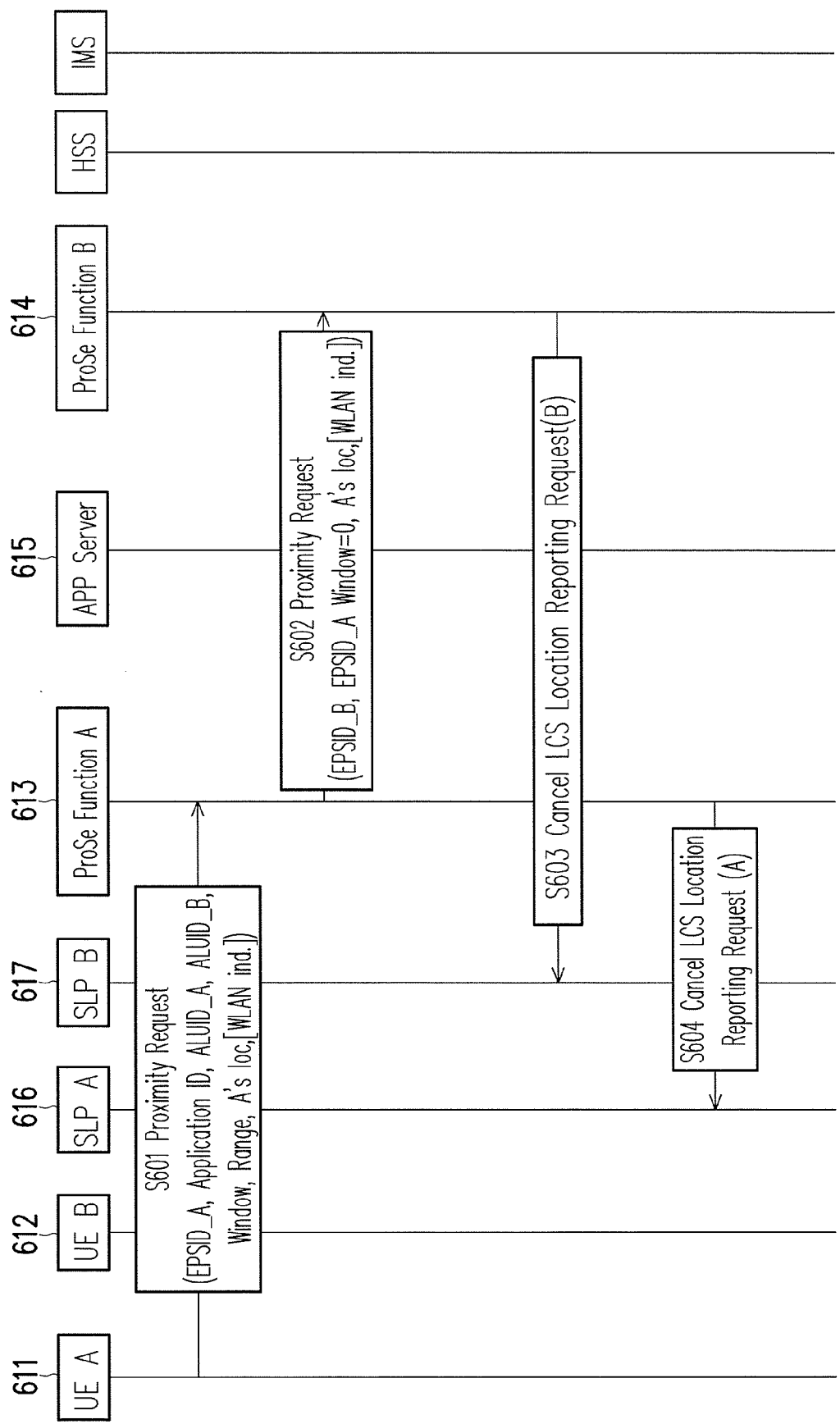
FIG. 5 illustrates a cancellation procedure of a UE initiated ProSe discovery process in accordance with one of the exemplary embodiment of the present disclosure.

FIG. 5 illustrates a cancellation procedure of a UE initiated ProSe discovery process in accordance with another one of the exemplary embodiment of the present disclosure. The cancellation procedure of FIG. 5 may correspond to step S401 or step S406 of FIG. 3. In step S601, UE A 611 would transmit a first Proximity Request to ProSe Function A 613. The first Proximity Request would contain parameters not limited to EPSID_A, Application ID, ALUID_A, ALUID_B, Window, Range (range class), A's loc. (location of UE A 611), and optionally [WLAN ind.]. The EPSID_A, Application ID, ALUID_A, ALUID_B, and Range are as previously described. The Window value is a non-negative value that would allow the network to handle a proximity service within a specific time interval as defined by or in relation to the Window value. Within this time interval, the network may trace the location of UEs in real time and continues interaction procedures between ProSe function B and ProSe function A, UE B, UE A and other related entities. The Window value could be set to a predetermined value so as to inform the cancellation or to further limit the duration of the ProSe discovery process. For example, the window value could be zero (Window=0) such that the ProSe discovery would be effectively cancelled as step S404 is executed. The [WLAN ind.] is the WLAN Link Layer ID as previously described.

In step S602, in response to receiving the first Proximity Request, the ProSe Function A 613 would transmit a second Proximity Request to ProSe Function B 614. The ProSe Function B 614 would contain parameters not limited to EPSID_A, EPSIB_B, Window, A's loc. (A Location of UE A 611), and optionally [WLAN ind.]. The Window value could be set to a predetermined value so as to inform the cancellation or to further limit the duration of the ProSe discovery process. In step S603, in response to receiving the second Proximity Request, ProSe Function B 614 would transmit a first cancel LCS Location Report Request to SLP B 617 in order to cancel the update of location report on UE A 611. Similarly in step S604, in response to receiving the first Proximity Request, ProSe Function A 613 would transmit a second cancel LCS Location Report Request to SLP A 616 in order to cancel the update of location reporting of UE B 612.

The network side may also assist a ProSe discovery cancelling procedure in response to receiving a Proximity Request from a UE. Essentially, in response to receiving from the UE the Proximity Request having an initial window value, a network entity such as a ProSe Function may terminate the ProSe discovery process in response to detecting specific parameters. The ProSe Function would then carry out subsequent procedures such as to obtain the status and proximities of UEs based on including paging or obtaining UE connection status recorded in MME or obtaining cell locations or range classes of UEs from location and/or application servers. The ProSe Function would then terminate the proximity discovery process and inform other ProSe Functions and location server of the termination process. The ProSe Function may also inform UEs of the cancellation by transmitting proximity request cancellation messages to these UEs. The details of the aforementioned network assisted ProSe discovery cancellation procedure proposed by the present disclosure is further illustrated by FIGS. 6~7 and their corresponding written descriptions.

Figure 6:
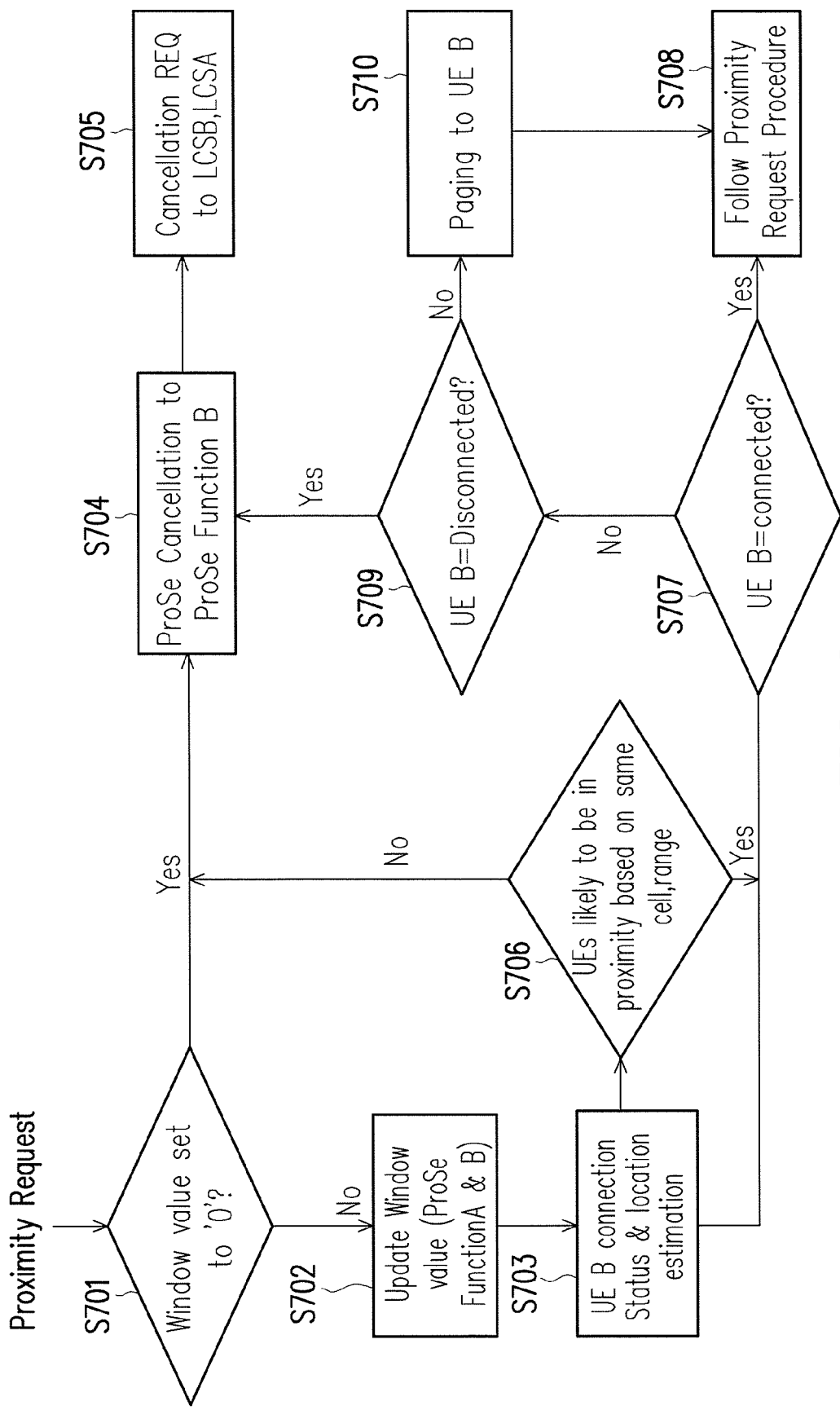
FIG. 6 is a flow chart that illustrates an EPC-level ProSe discovery process from the perspective of a ProSe Function in accordance with one of the exemplary embodiment of the present disclosure.

FIG. 6 is a flow chart that illustrates an EPC-level ProSe discovery process assisted by a network entity in accordance with one of the exemplary embodiment of the present disclosure. The network entity could be a stand-alone entity having a specific set of functionalities or could be considered as a specific set of functionalities embedded in other entities of a core network. The network entity could be, for example, ProSe Function in an EPC. In step S701, in response to receiving a Proximity Request from UE A for UE B by ProSe Function A, the ProSe Function A would determine whether the Window value in the Proximity Request has been set to be a specific value. The Window value could be set by a UE, and the specific value could be set to zero (Window=0) if the ProSe discovery process is to be terminated. If the ProSe Function A has determined that the Window value is set to zero, in step S704, ProSe Function A would transmit a ProSe cancellation request to the ProSe Function B which corresponds to UE B. In step S705, a cancellation request would also be sent to location server A (LCSA) and location server B (LCSB) which corresponds to UE A and UE B in order to cancel subsequent location updates.

If the Window value has not been set to zero in step S701, then in step S702, a network entity such as a ProSe Function A or ProSe Function B would update the Window value. In step S703, after updating the Window value, ProSe Function A and/or ProSe Function B would obtain the status of the connection of UE B as well as the estimated location of UE B. In step S706, the ProSe Function A and/or ProSe Function B would determine whether UE A and UE B are in proximity or are estimated to be in proximity within the time period indicated by the window value, based on, for example an initial relative distance between UE A and UE B (i.e., range) or based on whether UE A and UE B are located within the same or different cell. If UE A and UE B have been determined to be in proximity or estimated to be approximately in proximity, step S707 would be subsequently executed; otherwise, step S704 would be subsequently executed instead. If UE A and UE B are determined to be in proximity, then in step S707, the ProSe Function A and/or ProSe Function B would determine whether UE B is connected to the network. If UE B has been connected, then in step S708, the ProSe Function A and/or ProSe Function B would execute the subsequent Proximity Request Procedure. If UE B was not connected, then in step S709, the ProSe Function A and/or ProSe Function B would determine whether UE B has been disconnected. If UE B was determined to be disconnected then step S704 is to be executed. Otherwise, if UE B was not determined to be disconnected, the ProSe Function A and/or ProSe Function B would page UE B and subsequently execute step S708.

Figure 7:
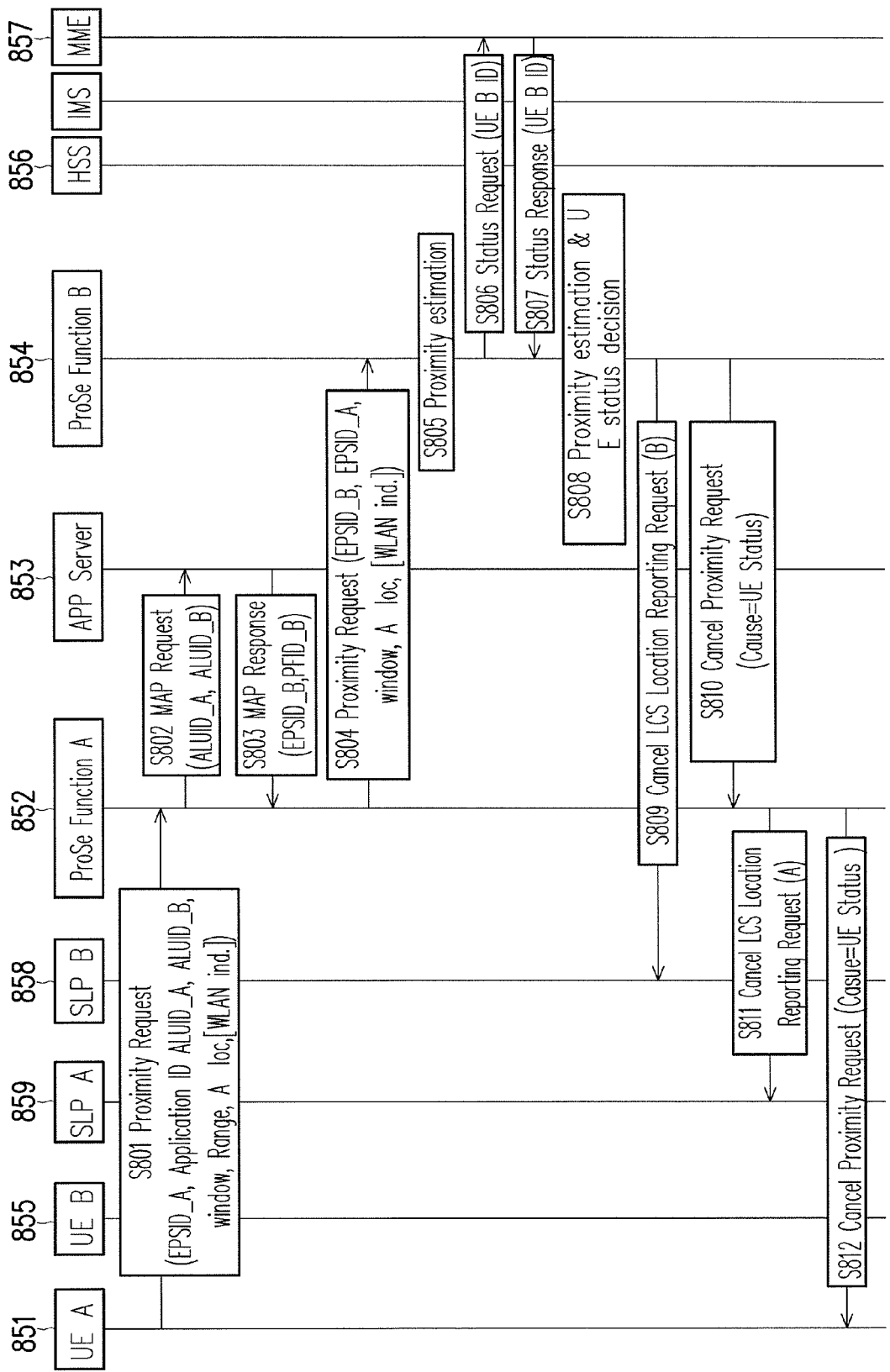
FIG. 7 illustrates a signaling diagram of a network assisted ProSe discovery process in accordance with one of the exemplary embodiment of the present disclosure.

FIG. 7 illustrates a signaling diagram of a network assisted ProSe discovery process in accordance with one of the exemplary embodiment of the present disclosure. In step S801, UE A 851 would transmit a first Proximity Request containing parameters not limited to EPSID_A, Application ID, ALUID_A, ALUID_B, window, Range, A's loc. (location of UE A), and optionally [WLAN ind.]. The descriptions of these parameters are the same as the previously mentioned descriptions. In step S802, in response to receiving the first Proximity Request, ProSe Function A 852 may send a Map Request containing parameters not limited to ALUID_A and ALUID_B to a ProSe App Server 853 (i.e., App Sever would be an Application Server) in order to request the App Server 853 to provide the EPC ProSe Subscriber ID and ProSe Function ID (PFID) for the targeted UE B 855. ProSe Function A 852 would store the Application Layer User IDs (ALUID_A and ALUID_B) until the execution of the Proximity Alert procedure or until the expiry of the time window during which the proximity request is valid.

Afterwards, the App Server 853 would check for application-specific ProSe permissions from UE B 855 in order to confirm that UE A 851 has been allowed to discover UE B 855. When that has been the case, in step S803, the App Server 853 would send a Map Response containing parameters not limited to EPSID_B and PFID_B to ProSe Function A 852, where the PFID_B is the ProSe Function ID of ProSe Function B 854. In step S804, ProSe Function A 852 would propagate a second Proximity Request that is based on the first Proximity Request to ProSe Function B 854. The second Proximity Request would contain parameters not limited to EPSID_A, EPSID_B, window, A's loc. (location of UE A 851), and optionally [WLAN ind.].

In step S805, the ProSe Function B 854 may perform proximity estimation. For example, based on EPSID_B received in step S804, ProSe Function B 854 may retrieve the subscriber record of UE B 855. For example, ProSe Function B 854 may request the last known location of UE B 855 via the HSS 856 for UE location query. In step S806, the ProSe Function B 854 may also obtain the connection status of UE B 855 via a MME 857 by transmitting a Status Request that contains a parameter not limited to UE B ID that is an ID of UE B 855. In response to transmitting the Status Request message, the ProSe Function B 854 would receive a Status Response that contains the ID of UE B 855 from MME 857. The status response may indicate UE status for example, Idle, detached and active Based on the last known location of UE B 855 obtained via the HSS 856, the location of UE A 851 and window value provided by ProSe Function A 852 in step S804, and also the connection status of UE B 855 in step S807, in step S808, ProSe Function B 854 would perform a Proximity estimation and UE connection status decision. Assuming that ProSe Function B 854 has determined that UE A 851 and UE B 855 are unlikely to be in proximity of each other within the requested time window or UE B 855 is disconnected or unlikely to be actively connected, and ProSe Function B 854 may decide to put an end to the ProSe discovery procedure. In step S809, ProSe Function B 854 may do so by sending a Cancel LCS Location Report Request to SLP B 858 in order to cancel the updates of the location of UE B 855 by the SLP B 858. In step S810, ProSe Function B 854 may transmit a Cancel Proximity Request to ProSe Function A 852 with an appropriate cause value in order to inform ProSe Function A 852 that the Prose discovery process is to be cancelled. In response to receive the Cancel Proximity Request message, in step S811, ProSe Function A 852 would transmit a Cancel LCS Location Reporting Request to SLP A 859 in order to cancel the updates of the location of UE A 851 by the SLP A 859. In step S812, ProSe Function A 852 would transmit a Cancel Proximity Request with the cause value equals to the UE status to UE A 851 in order to inform UE A 851 that the ProSe discovery process has been cancelled.

Figure 8:
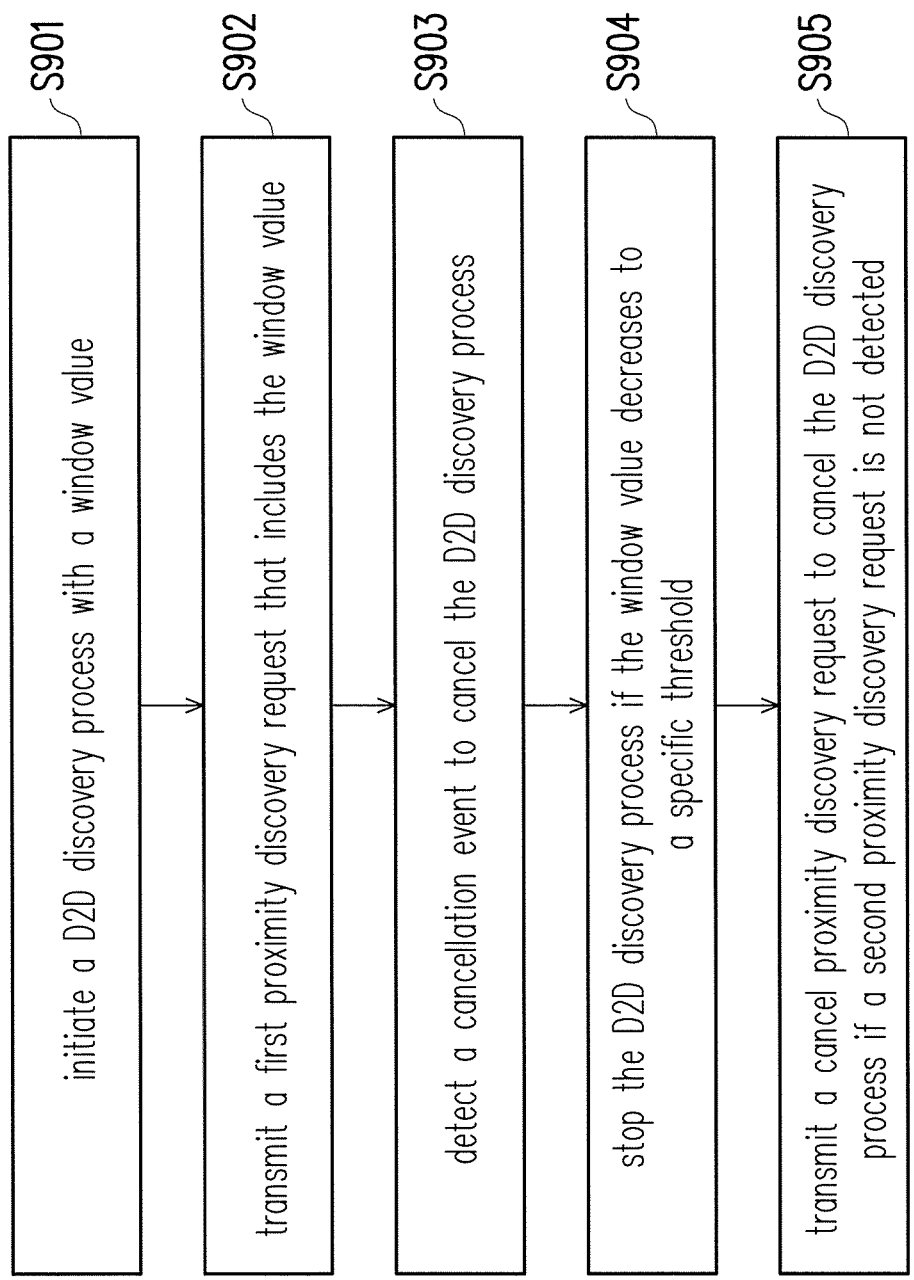
FIG. 8 illustrates a device to device (D2D) discovery method from the perspective of a user equipment (UE) in accordance with one of the exemplary embodiment of the present disclosure.

FIG. 8 summarizes the proposed device to device (D2D) discovery method from the perspective of a user equipment (UE) in accordance with one of the exemplary embodiment of the present disclosure. In step S901 the UE initiates a D2D discovery process with a window value, wherein the window value stands for a time window and is a positive number. In step S902, the UE transmits a first proximity discovery request that includes at least the window value. In step S903, the UE detects a cancellation event to cancel the D2D discovery process in response to transmitting the first proximity discovery request. The cancellation event could be from a hardware trigger initiated by a hardware component of the UE or a software trigger generated by, for example, the application layer of the UE. In step S904, the UE stops the D2D discovery process if the window value decreases to a specific threshold in response to detecting the cancellation event. In step S905, the UE transmits a cancel proximity discovery request to cancel the D2D discovery process in response to receiving the cancellation event if another proximity discovery request does not exist within the UE.

Said first proximity discovery request could be transmitted to a network entity within an evolved packet core (EPC) network. Said transmitting the cancel proximity discovery request could include transmitting the cancel proximity discovery request that is an explicit request and have parameters not limited to a network level identifier (ID), a server ID, an application layer discoverer ID, and/or an application layer discoveree ID. Said transmitting the cancel proximity discovery request could include transmitting a second cancel proximity discovery request that has parameters not limited to a window value set to a predefined value, a network level ID, a server ID, an application layer discoverer ID, an application layer discoveree ID, a range class, and a discoverer location information. The aforementioned window value could be, for example, set to zero. The parameters of said second cancel proximity discovery request could further include a wireless local area network (WLAN) link layer ID.

The method of FIG. 8 could also include waiting for a detect proximity response from a network entity in response to detecting the cancellation event and receiving from a network entity within an evolved packet core (EPC) network a third cancel proximity discovery request having a parameter that comprises a UE cause status.

Figure 9:
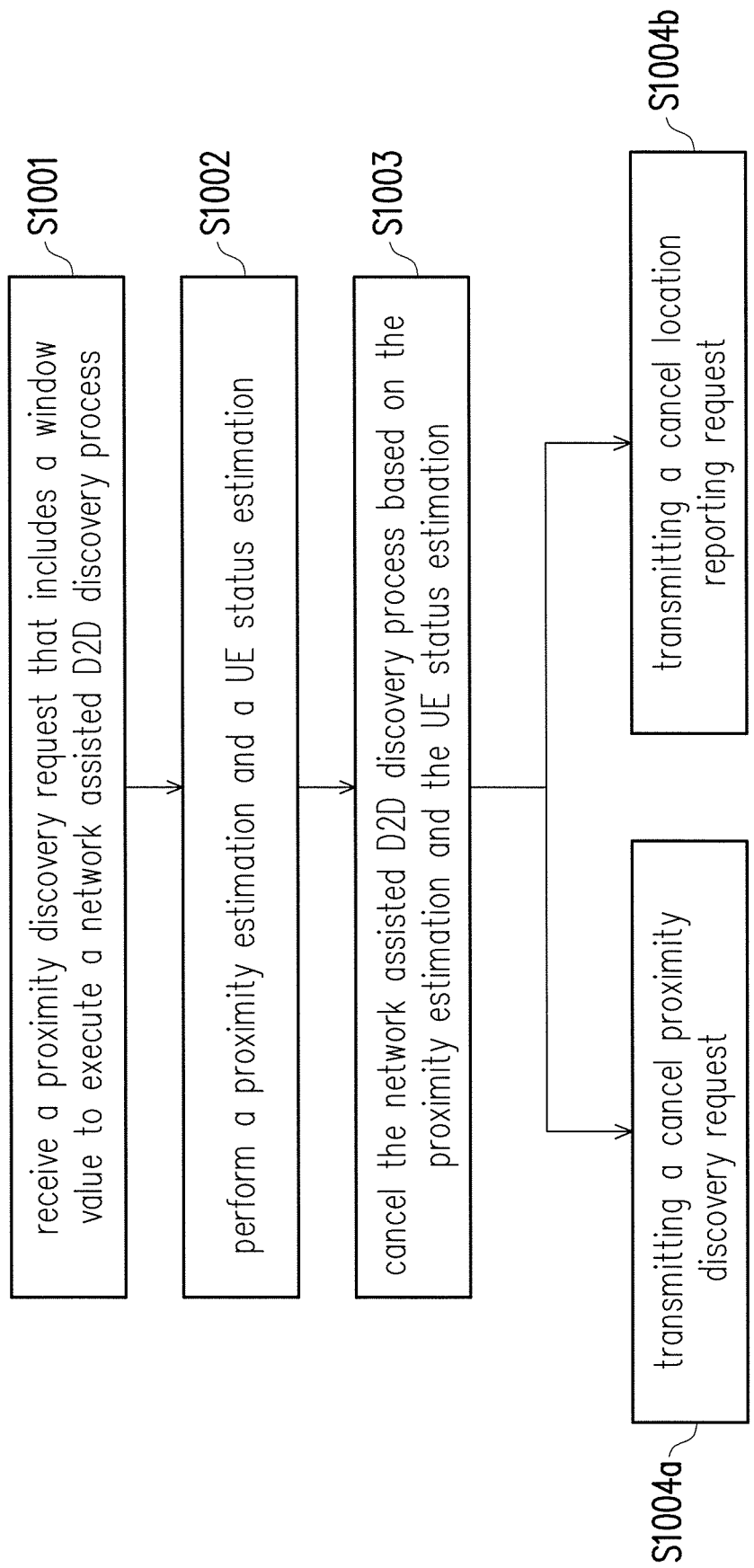
FIG. 9 illustrates a device to device (D2D) discovery method from the perspective of a network node in accordance with one of the exemplary embodiment of the present disclosure.

FIG. 9 summarizes the proposed device to device (D2D) discovery method from the perspective of a network entity in accordance with one of the exemplary embodiment of the present disclosure. In step S1001 the network entity receives a proximity discovery request that includes at least a window value to execute a network assisted D2D discovery process. In step S1002, the network entity performs a proximity estimation and a user equipment (UE) status estimation in response to receiving the proximity discovery request. In step S1003, the network entity cancels the network assisted D2D discovery process based on the results from performing the proximity estimation and the UE status estimation back in step S1002 by transmitting a cancel proximity discovery request in step S1004a and by transmitting a cancel location reporting request in step S1004b.

The method of FIG. 9 could further include receiving a second proximity discovery request which includes a second window value that is set to zero or a value smaller than initial window value and cancelling the network assisted D2D discovery process. Said the network entity could be a ProSe Function within an evolved packet core (EPC) and operates according to a version of a third generation partnership (3GPP) specification. The aforementioned performing the proximity estimation and the user equipment (UE) status estimation could include obtaining a first proximity information of a discoverer, obtaining a second proximity information of a discoveree, and determining whether the discoverer and the discoveree are in proximity or estimated to be in proximity within the time period indicated by widow value based on the first proximity information and the second proximity information.

The method of FIG. 9 could further include obtaining the UE status for example idle status, active status and detached from network status, of the discoveree and determine whether to cancel the network assisted D2D discovery process based on the status of the discoveree. Said obtaining the UE status of the discoveree could include transmitting a status request to a mobility management entity (MME), wherein the status request comprise a discoveree ID and receiving from the MME a status response that indicates the UE status of the discoveree. The method of FIG. 10 could also further include receiving a cancellation proximity request that has parameters comprising a network level identifier (ID), a server ID, an application layer discoverer ID, and an application layer discoveree ID.

Figure 10:
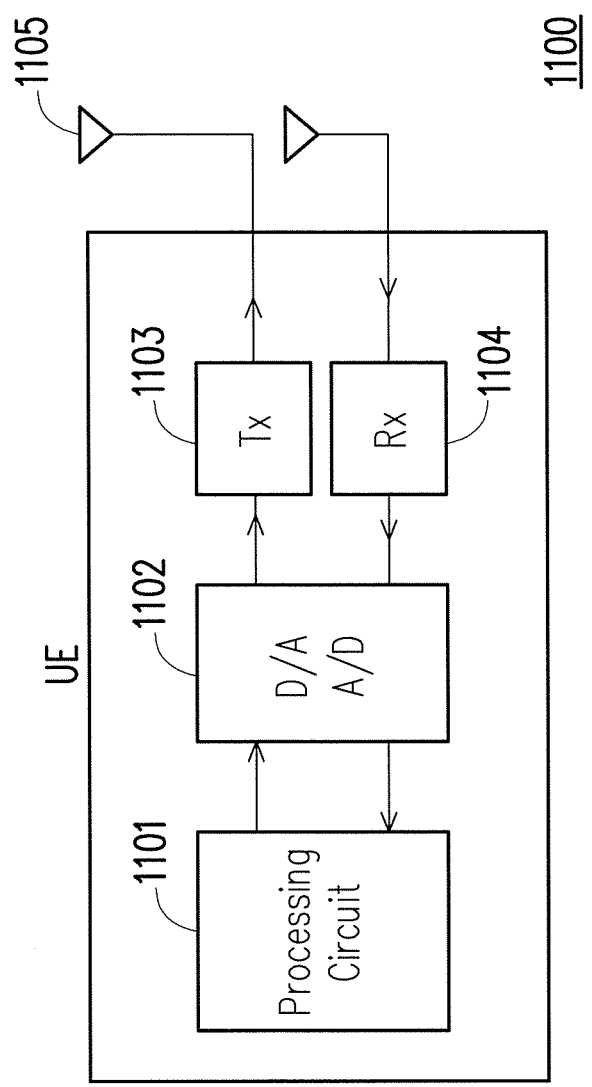
FIG. 10 illustrates an exemplary UE in accordance with the present disclosure.

FIG. 10 illustrates an exemplary UE in accordance with the present disclosure. The UE contains at least but not limited to a processing circuit 1101, coupled to an analog-to-digital (A/D)/digital-to-analog (D/A) converter 1102, a transmitter 1103, a receiver 1104, and one or more antenna units 1105. The transmitter 1103 and receiver 1104 transmit downlink signals and receive uplink signals wirelessly. The transmitter 1103 and receiver 1104 may also perform operations such as low noise amplifying, impedance matching, frequency mixing, up or down frequency conversion, filtering, amplifying, and so like. The (A/D)/(D/A) converter 1102 is configured to convert from an analog signal format to a digital signal format during uplink signal processing and from a digital signal format to an analog signal format during downlink signal processing. The processing circuit 1101 is configured to process digital signal and to perform procedures of the proposed D2D discovery method in accordance with the aforementioned exemplary embodiments of the present disclosure, especially FIG. 3~6 and FIG. 8 and their corresponding written description. Also, the processing circuit 1101 may optionally be coupled to a non-transitory storage medium to store programming codes, device configurations, a codebook, buffered or permanent data, and so forth. The functions of the processing circuit 1101 could be implemented by using programmable units such as a micro-processor, a micro-controller, a DSP chips, FPGA, etc. The functions of the processing circuit 1101 may also be implemented with separate electronic devices or ICs, and the functions performed by the processing circuit may be implemented within the domain of either hardware or software.

Figure 11:
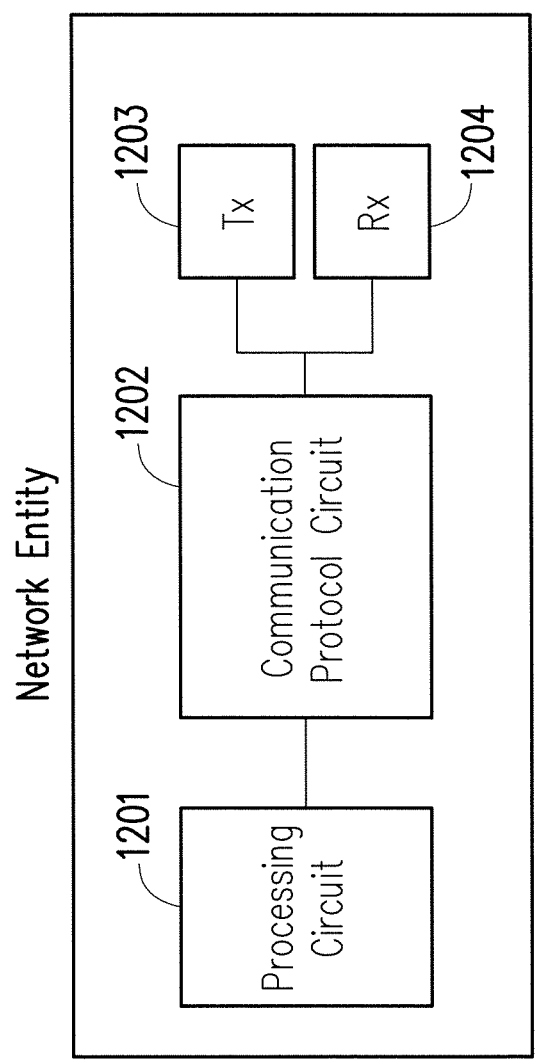
FIG. 11 illustrates an exemplary network entity in accordance with the present disclosure.

FIG. 11 illustrates an exemplary network entity in accordance with the present disclosure. The exemplary network entity could be a ProSe Function within an EPC network and would include at least but not limited to a processing circuit 1201 coupled to a communication protocol circuit 1202 which is coupled to a transmitter 1203 and a receiver 1204. The transmitter 1203 and the receiver 1204 are for transmitting and receiving modulated signals which could be wireless RF signals, optical signals, or signals sent over a cable. The communication protocol circuit 1202 could be independent from or an inherent part of the processing circuit 1201 and would convert a digital message into a format that is compatible with various interfaces such as PC2, PC3, PC4, PC4x, and so forth. The processing circuit 1201 is configured to process digital signal and to perform procedures of the proposed D2D discovery method in accordance with the aforementioned exemplary embodiments of the present disclosure, especially FIGS. 4~7 and FIG. 9 and their corresponding written description. Also, the processing circuit 1201 may optionally be coupled to a non-transitory storage medium to store programming codes, device configurations, a codebook, buffered or permanent data, and so forth. The functions of the processing circuit 1201 could be implemented by using programmable units such as a micro-processor, a micro-controller, a DSP chips, FPGA, etc. The functions of the processing circuit 1201 may also be implemented with separate electronic devices or ICs, and functions performed by the processing circuit may also be implemented within the domains of either hardware or software.

In view of the aforementioned descriptions, the present disclosure is suitable for being used in a wireless communication system and is able to dynamically stop a ProSe discovery procedure based on the demand of the ProSe application and network conditions as well as user preferences and settings. By minimizing network signaling related to proximity determinations and avoiding unnecessary computational power related to location update and proximity estimations, the loading of the network could be reduced and the efficiency of a network could be increased.

No element, act, or instruction used in the detailed description of disclosed embodiments of the present application should be construed as absolutely critical or essential to the present disclosure unless explicitly described as such. Also, as used herein, each of the indefinite articles "a" and "an" could include more than one item. If only one item is intended, the terms "a single" or similar languages would be used. Furthermore, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Further, as used herein, the term "set" is intended to include any number of items, including zero. Further, as used herein, the term "number" is intended to include any number, including zero.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

Moreover, the claims should not be read as limited to the described order or elements unless stated to that effect. In addition, use of the term "means" in any claim is intended to invoke 35 U.S.C. §112, ¶6, and any claim without the word "means" is not so intended.

What is claimed is:

1. A device to device (D2D) discovery method applicable to a user equipment (UE) comprising:

initiating a D2D discovery process with a first window value, wherein the first window value stands for a time window and is a positive number;

transmitting a first proximity discovery request comprising the first window value;

detecting a cancellation event to cancel the D2D discovery process in response to transmitting the first proximity discovery request;

stopping the D2D discovery process if the first window value decreases to a specific threshold in response to detecting the cancellation event; and transmitting a first cancel proximity discovery request to cancel the D2D discovery process in response to receiving the cancellation event if another proximity discovery request does not exist within the UE.

2. The method of claim 1, wherein the cancellation event is generated by either a hardware trigger of the UE or an application layer trigger of the UE.

3. The method of claim 1, wherein transmitting the first cancel proximity discovery request comprises:
transmitting the first cancel proximity discovery request that is an explicit request and have parameters comprising a network level identifier (ID), a server ID, an application layer discoverer ID, and an application layer discoveree ID.

4. The method of claim 1, wherein transmitting the first cancel proximity discovery request comprises:
transmitting a second cancel proximity discovery request that has parameters comprising a second window value set to a predefined value, a network level ID, a server ID, an application layer discoverer ID, an application layer discoveree ID, a range class, and a discoverer location information.

5. The method of claim 4, wherein the second window value is set to zero or set to be smaller than the first window value.

6. The method of claim 4, wherein the parameters of the second cancel proximity discovery request further comprise a wireless local area network (WLAN) link layer ID.

7. The method of claim 1, wherein the first proximity discovery request is transmitted to a network entity within an evolved packet core (EPC) network.

8. The method of claim 1 further comprising:
detecting a proximity response from a network entity in response to the cancellation event.

9. The method of claim 8 further comprising:
receiving from a network entity located within an evolved packet core (EPC) network a third cancel proximity discovery request having a parameter that comprises a UE cause status.

10. A user equipment (UE) comprising:
a wireless transmitter for transmitting wireless data;
a wireless receiver for transmitting wireless data;
a processing circuit coupled to the wireless transmitter and the wireless receiver and is configured for:
initiating a D2D discovery process with a window value, wherein the window value stands for a time window and is a positive number;
transmitting, by using the transmitter, a first proximity discovery request comprising the window value;
detecting a cancellation event to cancel the D2D discovery process in response to transmitting the first proximity discovery request;
stopping the D2D discovery process if the window value decreases to a specific threshold in response to detecting the cancellation event; and
transmitting, by using the transmitter, a cancel proximity discovery request to cancel the D2D discovery process in response to receiving the cancellation event and if another proximity discovery request does not exist within the UE.

11. A device to device (D2D) discovery method applicable to a network entity comprising:
receiving a first proximity discovery request comprising a first window value executed onto execute a network assisted D2D discovery process, wherein the first window value is a non-negative number;
performing a proximity estimation and a user equipment (UE) status estimation in response to receiving the proximity discovery request;
cancelling the network assisted D2D discovery process in response to performing the proximity estimation and the UE status estimation, wherein cancelling the network assisted D2D discovery process comprises:
transmitting a cancel proximity discovery request; and
transmitting a cancel location reporting request.

12. The method of claim 11 further comprising:
receiving a second proximity discovery request comprising a second window value that is set to zero; and
cancelling the network assisted D2D discovery process.

13. The method of claim 11, wherein the network entity is a ProSe Function located within an evolved packet core (EPC) and operates according to a version of a third generation partnership (3GPP) specification.

14. The method of claim 11, wherein performing the proximity estimation and the user equipment (UE) status estimation comprises:
obtaining a first proximity information of a discoverer;
obtaining a second proximity information of a discoveree;
determining whether the discoverer and the discoveree are in proximity based on the first proximity information and the second proximity information.

15. The method of claim 14 further comprising:
obtaining a UE status of the discoveree; and
determine whether to cancel the network assisted D2D discovery process based on the UE status of the discoveree.

16. The method of claim 15, wherein obtaining the UE status of the discoveree comprises:
transmitting a status request to a mobility management entity (MME), wherein the status request comprise a discoveree ID; and
receiving from the MME a status response that indicates the UE status of the discoveree.

17. The method of claim 11 further comprising:
receiving a cancellation proximity request that has parameters comprising a network level identifier (ID), a server ID, an application layer discoverer ID, and an application layer discoveree ID.

18. The method of claim 17 further comprising:
routing the cancellation proximity request to another network entity within the network.

19. The method of claim 11, wherein the network entity is a proximity based service (ProSe) Function of an Evolve Packet Core (EPC) network.

20. A network entity comprising:
a transmitter for transmitting data;
a receiver for receiving data;
a processing circuit coupled to the transmitter and the receiver and is configured for:
receiving through the receiver a first cancel proximity request comprising a network level discoverer identifier (ID), an application ID, and an application layer discoveree ID;
transmitting through the transmitter a second cancel proximity request comprising the network level discoverer ID and a network level discoveree ID in response to receiving the first cancel proximity request;
receiving through the receiver a first acknowledgement signal that corresponds to the second cancel proximity request in response to transmitting the second cancel proximity request;
and transmitting through the transmitter a second acknowledgement signal that corresponds to the first cancel proximity request in response to receiving the first acknowledgement signal.

21. A device to device (D2D) discovery method applicable to a network entity comprising:

receiving a first cancel proximity request comprising a network level discoverer identifier (ID), an application ID, and an application layer discoveree ID;

transmitting a second cancel proximity request comprising the network level discoverer ID and a network level discoveree ID in response to receiving the first cancel proximity request;

receiving a first acknowledgement signal that corresponds to the second cancel proximity request in response to transmitting the second cancel proximity request; and transmitting a second acknowledgement signal that corresponds to the first cancel proximity request in response to receiving the first acknowledgement signal.

22. The method of claim 21 further comprising:

transmitting a first cancel location reporting signal after transmitting the second cancel proximity request.

23. The method of claim 22 further comprising:

transmitting a second cancel location reporting signal after transmitting the first cancel location reporting signal.

24. The method of claim 21, wherein the network entity is a (proximity based service) ProSe Function within an evolve packet core (EPC) network.

25. The method of claim 22, wherein receiving the first cancel proximity request comprises receiving the first cancel proximity request from a user equipment (UE).

26. The method of claim 25, wherein the first cancel location reporting signal cancels location reporting of the user equipment.

27. The method of claim 21, wherein transmitting the second cancel proximity request comprises transmitting the second cancel proximity request to another ProSe Function within an EPC network.

28. The method of claim 27, wherein receiving a first acknowledgement signal comprises receiving the first acknowledgment signal from the another ProSe Function within the EPC network.

29. The method of claim 25, wherein transmitting the second acknowledgment signal comprises transmitting the second acknowledgement signal to the UE.

* * * * *